Aug. 10, 1948.  L. LAWRASON  2,446,655
METHOD AND APPARATUS FOR CLARIFYING
ALKALINE WELL WATERS
Filed Oct. 6, 1945
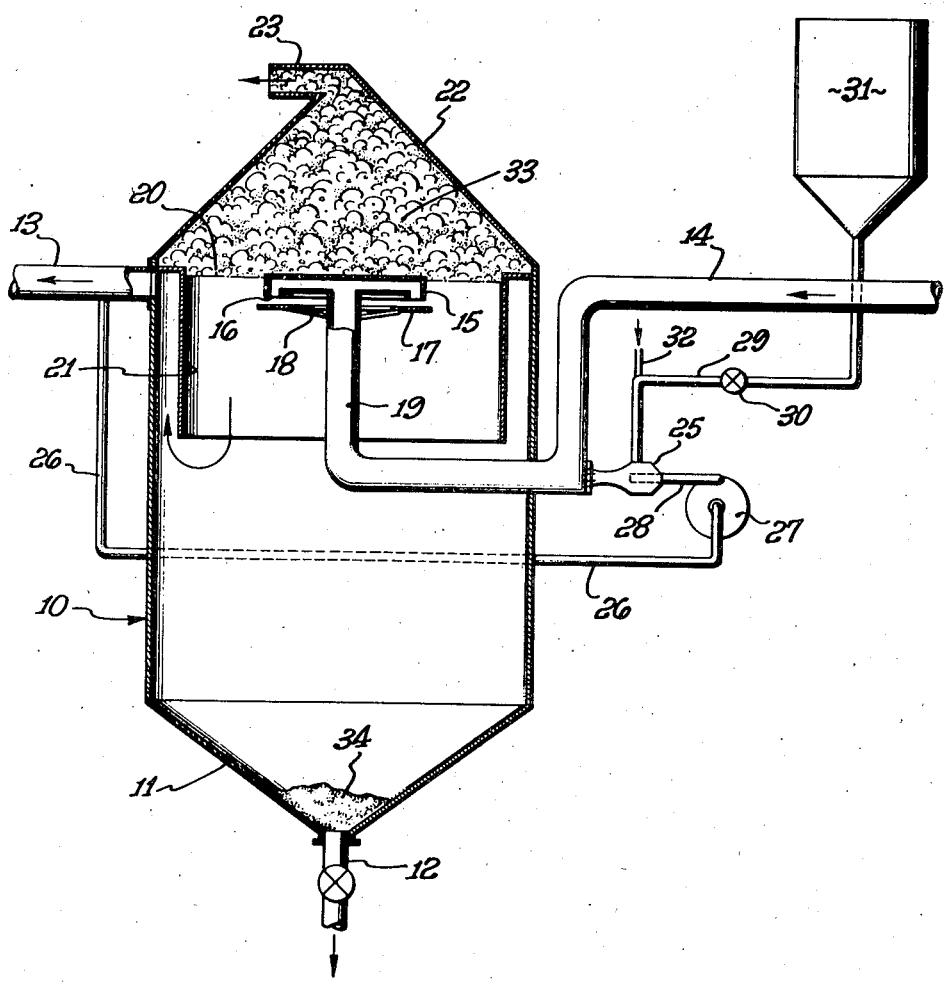
INVENTOR.
LEVERING LAWRASON,
BY
ATTORNEY.

Patented Aug. 10, 1948

2,446,655

UNITED STATES PATENT OFFICE 2,446,655

METHOD AND APPARATUS FOR CLARIFYING ALKALINE WELL WATERS

Levering Lawrason, Palos Verdes Estates, Calif., assignor to Deepwater Chemical Co. Ltd., Compton, Calif., a corporation of California Application October 6, 1945, Serial No. 620,809

5 Claims. (Cl. 210—53)

This invention pertains to methods and apparatus for treating contaminated or dirty deep well waters and is particularly directed to the clarification and treatment of alkaline deep well brines.

In practically every oil producing field the deep wells not only produce oil but in many instances, tremendous quantities of water. These deep well waters, particularly along the Pacific Coast and Gulf of Mexico, are alkaline in character. Furthermore, these waters form a readily available source of iodine, but the extraction of iodine from these brines requires the purification and clarification of the waters as a preliminary operation.

Even when iodine is not being extracted from these waters, they must be clarified or treated before being disposed of into sewers or rivers, since in most cases the waters are contaminated with various impurities such as siliceous materials and other insoluble solids and both soluble and insoluble organic matter. The organic matter is apparently derived from petroleum and is in the form of sulfonates and soaps. Although these organic constituents may be present in but small proportion, they are extremely difficult to remove and cannot be removed by ordinary filtration, even though filter aids be employed in an attempt to obtain clarification. When these contaminated brines are carefully filtered by the use of diatomaceous earth as a filter aid, they appear to be sparkingly clear but upon standing they develop an opalescence and scum and objectionable odors similar to those of mercaptans and hydrogen sulfide are given off.

In view of the very large volumes of brines produced in the oil fields, the problem of disposing of or clarifying the waters is of considerable importance. The present invention is directed to a very simple, inexpensive and highly efficient method of handling large volumes of such well waters and brines in a continuous manner, the resulting clarified brines being of a sufficiently high purity to permit their use as a source of iodine without poisoning the iodine recovery process or complicating the extraction.

It has been discovered that the various solid and liquid contaminants of deep well brines, both soluble and insoluble, may be efficiently and rapidly removed in the form of a froth by the use of a reagent and air. The reagent may be any water-soluble, trivalent salt of iron, aluminum or manganese. The selected reagents, in the presence of air, form soaps which appear to prevent the formation of ferrous compounds and instead coagulate suspended matters, emulsified oils and dissolved constituents in the brines and also form with some of the organic impurities insoluble soaps which act as a frothing agent, causing the various coagulating impurities to float. As a result, most of the impurities and contaminants may be removed as a froth or dark, porous, lightweight mass, while larger particles of insoluble solids, in the absence of the dissolved impurities and organic matters, settle with great rapidity and may be withdrawn as a sludge.

It is an object of the present invention, therefore, to disclose a continuous process of treating well waters for the purpose of removing therefrom soluble and insoluble organic matters.

A further object of the invention is to disclose and provide a rapid and inexpensive method of treating alkaline well brines contaminated with both soluble and insoluble inorganic and organic matters.

Another object of the invention is to disclose and provide an apparatus capable of handling large volumes of alkaline well brines in an inexpensive manner.

These and other objects will become apparent from the following description of an exemplary form of apparatus in which the method may be employed and of conditions, proportions, and ingredients found to be best suited for the performance of the process. In order to facilitate understanding, reference will be had to the appended drawing, which schematically shows one satisfactory arrangement.

It has been determined that the organic matter in oil field brines is very unstable and easily oxidized by air and apparently contains sulfur in some form. In the event these brines are pumped through iron pipes or stored in iron tanks, a form of reaction or bacterial action sets in rapidly and malodorous gases, including hydrogen sulfide, are given off. After a prolonged period of settlement in a tank, it will be found that a sludge collects in the bottom, this sludge containing black, ferrous sulfide. Some attempt has been made to employ Dorr thickeners or clarifiers for the purpose of expediting the extremely slow sedimentation and sludge formation and ferric chloride has been added to the brine in such thickeners. This expedient, however, has not been satisfactory, since even larger quantities of black ferrous sulfide are obtained in the sludge resulting from such thickeners and the evolution of malodorous gases is increased. The various sulfates and sulfonates or sulfuric compounds contained in the organic matter dissolved and dispersed throughout the brines appear to readily attack metal equipment and result in the formation of ferrous compounds which are slowly converted to ferrous sulfide.

It has been discovered that these oil field brines contain true soap in solution, the soaps being presumably derived from the petroleum fatty acids. The present invention is based upon the discovery that these various soaps may be readily converted into ferric soaps by simultaneously injecting ferric chloride and air into a rapidly moving stream of contaminated brine and then immediately permitting the mixture to settle in a low velocity zone. The soaps thus formed act as a frothing agent and float to the surface substantially all organic matter. The solubility of certain organic compounds in the brine is, moreover, reduced by the formation of these soaps so that the effluent or clarified brine obtained is free from the soluble organic matters and does not develop the opalescence or scum which is obtained when the brine is simply filtered very carefully.

Another important and unexpected result which is attained by the performance of this method is the rapid sedimentation of the larger particles of siliceous or calcareous materials carried by the brine. A clear-cut separation may be obtained in a matter of minutes, whereas other methods of procedure produce indefinite results even after days of sedimentation.

The reagents found most useful in the performance of the process are water-soluble, trivalent salts of iron, aluminum and manganese. Ferric chloride, manganic chloride and aluminum chloride are examples. Zinc chloride may also be employed, as well as the nitrates and sulfates of the metals stated. From a commercial point of view, ferric chloride appears to give most economical results. Aqueous solutions of these reagents are injected into a flowing stream of contaminated, fresh brine by the use of air or with a considerable quantity of air. The presence of air appears to be essential in order to maintain the compounds in the ferric form. Moreover, the aqueous solution of reagent should be injected simultaneously with the air so as to obtain an efficient and relatively stable froth.

It is to be understood that all of the operations are carried out at atmospheric temperatures, this condition distinguishing the present process from some prior attempts which employed high temperatures.

A typical operation may be carried out in an apparatus of the character shown in the appended drawing. As there shown, the apparatus may comprise a cylindrical tank 10 provided with a conical bottom 11 having a valved outlet 12. This separation tank may be provided with a discharge conduit 13 leading from the top of the tank, the discharge conduit being virtually horizontal and headless; that is, it should not include a water leg or the like for the purpose of imposing a pressure upon the tank. The tank is also provided with a supply conduit 14 and with means for continuously supplying contaminated brine to the supply conduit such as a suitable pump, not shown. In the particular form of apparatus illustrated, the supply conduit 14 extends into the axis of the tank 10 and the end of such conduit is provided with a distributor, generally indicated at 15, such distributor having either a continuous, annular, downwardly directed opening 16 or a plurality of circularly arranged discharge openings. In the form shown, the distributor has an annular discharge opening and is provided with baffle 17 for the purpose of dispersing the incoming brine in a horizontal direction. The baffle 17 is suitably supported as by means of spiders 18 from the upstanding leg 19 of the supply conduit.

It is to be noted that the distributor is positioned at about the level of the discharge conduit 13. The rate of supply of incoming brine through the supply conduit 14 is such that a substantially constant operating level 20 is maintained within the tank 10, this level 20 being only sufficiently higher than the outlet 13 to overcome frictional resistance. Discharge ports, such as the ports 16, of the distributor should be immediately beneath this operating level 20.

In the form of apparatus illustrated, a cylindrical, inner skirt 21 is carried by the inner surface of the tank, such skirt extending approximately half-way down the tank height. The tank 10 may also be provided with a conical cover 22 provided with a discharge port 23 of materially smaller cross-sectional area than the area of the surface 20 of the body of brine within the tank 10.

Various means for injecting air and an aqueous solution of reagent into the rapidly flowing, incoming stream of contaminated brine may be employed. In the drawing, a jet-type injector is illustrated at 25, this injector discharging into the supply conduit 14. The injector may be supplied with clarified, clean brine from a branch line 26 extending from the discharge conduit 13 and leading to a pump 27, whose discharge port is connected to the injector 25 by line 28. The injector is also provided with a feeding line 29 provided with a valve 30 and connected to a supply tank 31 containing the aqueous solution of reagent. Suitable air intakes such as 32 are also provided. In the arrangement schematically illustrated, the jet of clean brine passing through the injector into the supply conduit 14 creates a vacuum which draws in considerable quantities of air through the intakes 32 and at the same time disseminates, atomizes and sprays the reagent solution flowing through the line 29 into the moving stream of contaminated brine. The amount of reagent supplied to the incoming brine may be regulated by the valve 30.

In actual operation, a body of brine is established within the tank 10, contaminated brine being continuously supplied by line 14 and the level 20 being maintained by reason of the discharge line 13. When the injection of reagent and air is initiated, it will be found that ferric soaps are formed, these soaps forming a froth containing organic matters and other impurities, the froth immediately rising to the surface of the body of brine within the tank. Some siliceous material will rapidly fall to the bottom of tank 10. It has been found desirable to use the skirt 21 for the purpose of preventing the froth, generally indicated at 33, from flowing out the outlet 13 and for facilitating the gravitational separation of the solid impurities such as siliceous material. These heavy particles eventually form a deposit of sludge 34 which may be drained out through the valve outlet 12.

The froth 33 should contain considerable quantities of entrained air. The presence of air is essential to prevent the formation of ferrous compounds. It has been found desirable to use a conical cover 22 in order to collect the froth 33 and to compact it somewhat. The buoyancy of the froth 33 causes the froth to be somewhat compressed against the converging, conical cover 22, reducing the bulk of the frothy mass, expressing some entrained water therefrom and causing the froth to be eventually discharged through the port 23 in the form of a coherent column or ribbon. Vacuum or suction should not be applied to 23 as that would impair the effectiveness of the process. This froth is readily disposed of and after some drying, may be burned. It may also be subjected to a recovery process for the purpose of recovering petroleum compounds and soaps.

The efficiency of this mode of operation will be appreciated from a consideration that a tank six feet in diameter and six feet high has readily handled approximately one-half million gallons of brine per day, whereas the same capacity would require a Dorr clarifier thirty eight feet in diameter and sixteen feet deep, a skimming basin having an area of about four thousand square feet and a sand filter bed of well over two hundred square feet in area, with not as satisfactory results.

The concentrations of the aqueous solutions of reagents employed are not critical. It has been found that from between about 40 to 80 parts per million of ferric chloride (or other suitable reagent) should be added to the incoming brine. It may be noted in passing that the use of sulfates is not recommended in the event the clarified brines are to be used as a source of iodine, particularly where the silver iodide method of recovery is employed.

It is to be understood from the example given in the preceding paragraph that the entire reaction and clarification takes place with extreme rapidity. It may be stated that the froth and the products of reaction produced by the simultaneous injection of air and reagent into the incoming brine should be liberated within the relatively quiescent body of brine within the tank shortly after injection and certainly within thirty seconds after the reagent and air have been added to the incoming brine. Moreover, best results have been accomplished by liberating the freshly treated brine immediately beneath the surface of the body of brine within the tank and at a depth not exceeding about six inches. Under these conditions the froth is rapidly formed and floated to the surface of the body with minimum inclusion of aqueous fluids.

Although the application has been particularly directed to the treatment of well brines, it is to be understood that other sources of contaminated water may be similarly treated. For example, bilge water may be treated in accordance with this invention and utilized so as to prevent contamination of harbors with oil scum. In the treatment of bilge water or the like, it may be desirable to add soda ash thereto (prior to the injection of air and aqueous reagent solution), the soda ash being added in quantities sufficient to increase the pH to between about 7.3 and 8. Alkaline well brines are generally in this range of pH, although occasionally a pH as high as 8.5 is encountered.

Those skilled in the art will readily understand that the invention is not limited to the specific arrangement or design of apparatus shown in the appended drawing, inasmuch as many variations may be used in carrying out the method herein disclosed. All changes and modifications coming within the scope of the appended claims are embraced thereby.

I claim:

1. A method of treating alkaline brines contaminated with insoluble inorganic solids and soluble and insoluble organic matter comprising the steps of: establishing a relatively quiescent body of brine; continuously supplying fresh contaminated brine to the upper portion of said body and withdrawing clarified brine from substantially the medial portion of said body at a predetermined rate to maintain the surface of the body at a substantially constant level; continuously injecting air and an aqueous solution of ferric chloride simultaneously and at a common point exteriorly of the body into a moving stream of brine being supplied to said body; discharging the mixture including products of reaction in the form of a buoyant air-filled froth immediately beneath the surface of the quiescent body; and collecting the froth above the surface of the liquid body.

2. A method of treating alkaline brines contaminated with insoluble inorganic solids and soluble and insoluble organic matter comprising the steps of: establishing a relatively quiescent body of brine; continuously supplying fresh contaminated brine to immediately below the surface of said body and withdrawing clarified brine from substantially the medial portion of said body at a predetermined rate to maintain the surface of the body at a substantially constant level; continuously injecting air and an aqueous solution of ferric chloride simultaneously and at a common point into a moving stream of brine being supplied to said body; discharging the mixture including products of reaction in the form of a buoyant air-filled froth immediately beneath the surface of the quiescent body; collecting the froth above the surface of the liquid body; utilizing the buoyancy of the froth to compact the same and discharging the froth as a column of materially smaller cross-sectional area than the area of the surface of the body of the brine.

3. A method of treating alkaline brines contaminated with insoluble inorganic solids and soluble and insoluble organic matter comprising the steps of: establishing a relatively quiescent body of brine; continuously supplying fresh contaminated brine to immediately beneath the surface of said body and withdrawing clarified brine from substantially the medial portion of said body at a predetermined rate to maintain the surface of the body at a substantially constant level; continuously injecting air and an aqueous solution of a water-soluble, inorganic, metallic salt simultaneously and at a common point into a moving stream of contaminated brine being supplied to said body, said aqueous solution containing a metallic salt from the group consisting of ferric chloride, ferric sulfate, ferric nitrate, aluminum chloride, aluminum sulfate, aluminum nitrate, trivalent manganic chloride, manganic sulfate, and manganic nitrate; discharging the mixture including the products of reaction in the form of a buoyant froth immediately beneath the surface of the quiescent body; collecting the froth above the surface of the liquid body; and conveying the froth upwardly from the surface of the liquid body by action of accumulating froth.

4. A process of the character stated in claim 1 in which the ferric chloride is injected in quantities sufficient to add between 40 and 80 parts of ferric chloride per million parts of incoming brine.

5. An apparatus for continuously clarifying alkaline brines comprising: a cylindrical tank provided with side walls and a conical bottom and a valved outlet in such bottom; a cylindrical skirt positioned within the tank and spaced from the side walls thereof, the upper end of the skirt being attached to the top of the tank side walls to form an annular chamber open at the bottom to the interior of the tank; a free, virtually unobstructed, horizontal, discharge conduit from the top of the tank in communication with the top of said annular chamber; a supply conduit leading into said tank, a distributor within the tank and connected to the supply conduit, said distributor being at the level of the discharge conduit; injection means associated with the supply conduit adjacent the tank; means for supplying air and a solution of reagent simultaneously to the injection means; a conical cover for the tank extending upwardly above the tank side walls; and a froth discharge port in said cover in communication with the atmosphere.

LEVERING LAWRASON.

REFERENCES CITED

The following references are of record in the file of this patent:

UNITED STATES PATENTS

| Number | Name | Date |
|---|---|---|
| 793,808 | Sulman et al. | July 4, 1905 |
| 864,856 | Norris | Sept. 3, 1907 |
| 1,333,393 | Edser | Mar. 9, 1920 |
| 1,662,702 | Hebden | Mar. 13, 1928 |
| 1,717,223 | Karlstrom | June 11, 1929 |
| 1,847,080 | Buswell | Mar. 1, 1932 |
| 2,054,798 | Gibson | Sept. 22, 1936 |
| 2,094,909 | Baily et al. | Oct. 5, 1937 |
| 2,246,224 | Streander | June 17, 1941 |
| 2,248,177 | Karlstrom | July 8, 1941 |
| 2,324,400 | Kelly et al. | July 13, 1943 |
| 2,360,812 | Kelly et al. | Oct. 17, 1944 |
| 2,375,282 | Clemens | May 8, 1945 |

FOREIGN PATENTS

| Number | Country | Date |
|---|---|---|
| 10,867 | Great Britain | 1904 |
| 33,200 | Sweden | Feb. 15, 1909 |
| 457,149 | Great Britain | Nov. 23, 1936 |